US012731230B2

(12) United States Patent
Fujiwara

(10) Patent No.: US 12,731,230 B2
(45) Date of Patent: Sep. 8, 2026

(54) PROCESSOR, IMAGE PROCESSING METHOD, AND IMAGE PROCESSING PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 58 days.

(21) Appl. No.: 18/435,548

(22) Filed: Feb. 7, 2024

(65) Prior Publication Data

US 2024/0289927 A1 Aug. 29, 2024

(30) Foreign Application Priority Data

Feb. 28, 2023 (JP) ................................ 2023-030563

(51) Int. Cl.

| | |
|---|---|
| ***G06T 5/73*** | (2024.01) |
| ***G06T 7/00*** | (2017.01) |
| ***G09G 3/00*** | (2006.01) |

(52) U.S. Cl.

CPC .............. *G06T 5/73* (2024.01); *G06T 7/0002* (2013.01); *G09G 3/001* (2013.01); *G06T 2207/30168* (2013.01)

(58) Field of Classification Search

CPC ...... G02B 2027/014; G02B 2027/0147; G02B 27/0172; G06F 3/011; G06T 2207/30168; G06T 5/73; G06T 7/0002; G09G 2340/0407; G09G 2340/12; G09G 3/001; G09G 5/37; G09G 5/377; G09G 5/391

See application file for complete search history.

(56) References Cited

U.S. PATENT DOCUMENTS

2013/0257908 A1 10/2013 Ota et al.
2015/0241708 A1* 8/2015 Watanabe .............. A61L 9/035 386/230
2020/0051320 A1* 2/2020 Laffont .................... G06T 5/70
2024/0138668 A1 5/2024 Lee et al.

FOREIGN PATENT DOCUMENTS

JP 2011170642 A * 9/2011 ............. G06F 3/011
JP 2012-174116 A 9/2012
JP 2021110904 A * 8/2021
KR 10-2023-0007611 A 1/2023

OTHER PUBLICATIONS

Extended European Search Report for corresponding European Application No. 24158713.8, dated May 28, 2024.
European Communication pursuant to Article 94(3) EPC for corresponding European Application No. 24158713.8, dated Mar. 20, 2026.

* cited by examiner

*Primary Examiner* — Yingchun He
(74) *Attorney, Agent, or Firm* — Birch, Stewart, Kolasch & Birch, LLP

(57) ABSTRACT

A processor is included in a glasses-type display device that is capable of allowing a user to visually recognize a display image displayed on a display unit as a virtual image together with a real space, and the processor performs image processing based on a visual characteristic of the user on the display image, and displays the display image after the image processing on the display unit.

13 Claims, 10 Drawing Sheets

41
60
VISUAL CHARACTERISTIC INFORMATION
50
VISUAL CHARACTERISTIC INFORMATION ACQUISITION UNIT
54
IMAGE PROCESSING UNIT
56
DISPLAY CONTROLLER
BLURRINESS DEGREE DETERMINATION UNIT
PROJECTION IMAGE
PROJECTION IMAGE ACQUISITION UNIT
55
74
52
PROCESSOR

| DISTANCE | VISUAL ACUITY | DEGREE OF BLURRINESS |
|---|---|---|
| 1.5 km OR MORE | 1.2 OR MORE | 0 |
| | 0.9 OR MORE AND LESS THAN 1.2 | 1 |
| | 0.6 OR MORE AND LESS THAN 0.9 | 3 |
| | 0.3 OR MORE AND LESS THAN 0.6 | 5 |
| | 0.1 OR MORE AND LESS THAN 0.3 | 7 |
| | LESS THAN 0.1 | 10 |
| 1 km OR MORE AND LESS THAN 1.5 km | 1.2 OR MORE | 0 |
| | 0.9 OR MORE AND LESS THAN 1.2 | 0 |
| | 0.6 OR MORE AND LESS THAN 0.9 | 1 |
| | 0.3 OR MORE AND LESS THAN 0.6 | 4 |
| | 0.1 OR MORE AND LESS THAN 0.3 | 7 |
| | LESS THAN 0.1 | 10 |
| ⋮ | ⋮ | ⋮ |
| LESS THAN 1 m | 1.2 OR MORE | 0 |
| | 0.9 OR MORE AND LESS THAN 1.2 | 0 |
| | 0.6 OR MORE AND LESS THAN 0.9 | 0 |
| | 0.3 OR MORE AND LESS THAN 0.6 | 0 |
| | 0.1 OR MORE AND LESS THAN 0.3 | 1 |
| | LESS THAN 0.1 | 3 |

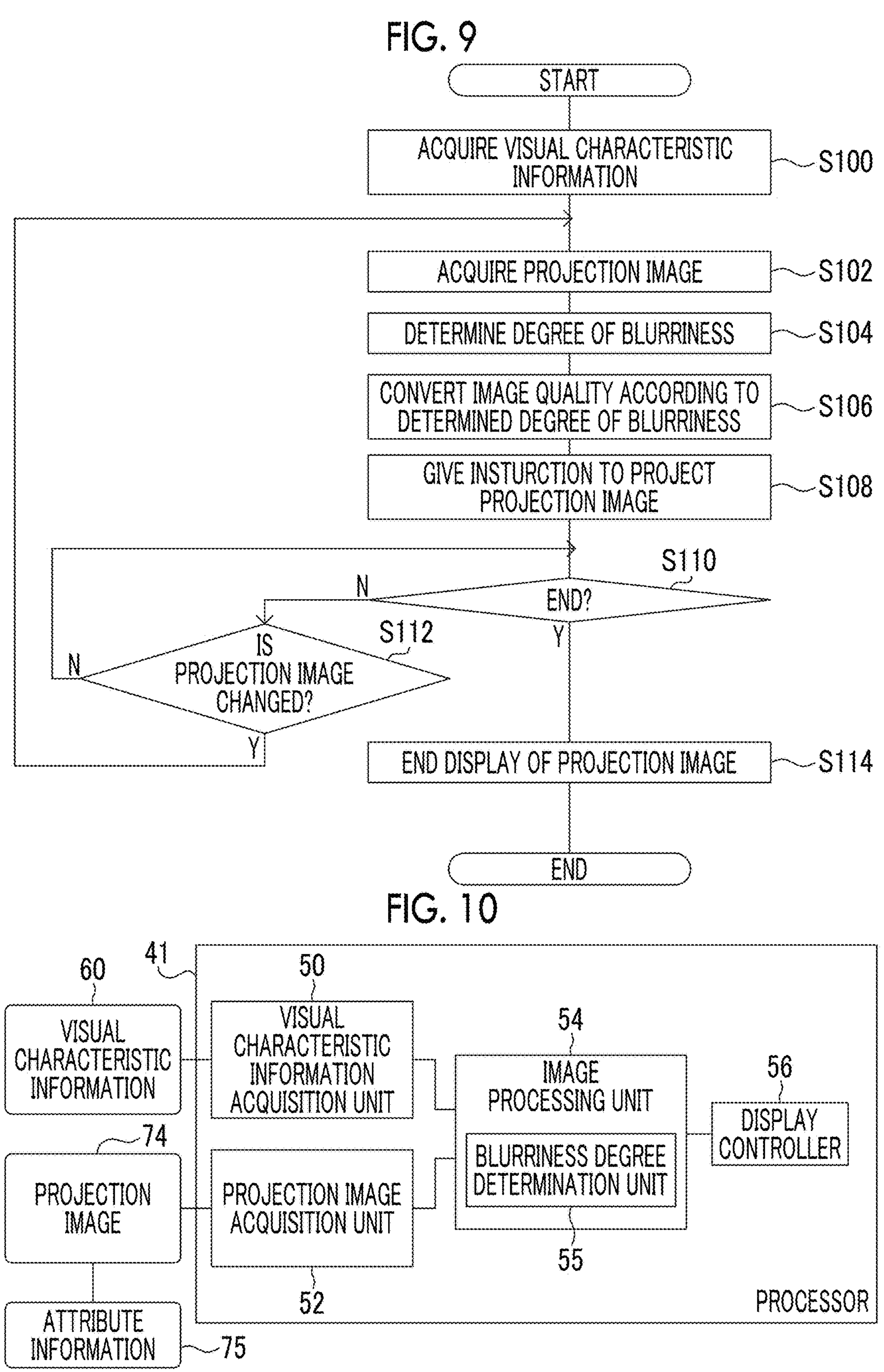
FIG. 9
START
ACQUIRE VISUAL CHARACTERISTIC INFORMATION
S100
ACQUIRE PROJECTION IMAGE
S102
DETERMINE DEGREE OF BLURRINESS
S104
CONVERT IMAGE QUALITY ACCORDING TO DETERMINED DEGREE OF BLURRINESS
S106
GIVE INSTURCTION TO PROJECT PROJECTION IMAGE
S108
S110
END?
N
Y
S112
IS PROJECTION IMAGE CHANGED?
N
Y
END DISPLAY OF PROJECTION IMAGE
S114
END
FIG. 10
60
VISUAL CHARACTERISTIC INFORMATION
41
50
VISUAL CHARACTERISTIC INFORMATION ACQUISITION UNIT
54
IMAGE PROCESSING UNIT
BLURRINESS DEGREE DETERMINATION UNIT
55
56
DISPLAY CONTROLLER
74
PROJECTION IMAGE
PROJECTION IMAGE ACQUISITION UNIT
52
PROCESSOR
ATTRIBUTE INFORMATION
75

| ATTRIBUTE | EVALUATION VALUE |
|---|---|
| CHARACTER | 6 |
| PERSON | 3 |
| BACKGROUND | 0 |
| STEP | 10 |
| BUS STOP | 9 |
| NAME OF STATION | 9 |
| ⋮ | ⋮ |

| EVALUATION VALUE | AMOUNT OF REDUCTION |
|---|---|
| 12 OR MORE | 10 |
| 10 OR MORE AND LESS THAN 12 | 8 |
| 6 OR MORE AND LESS THAN 10 | 6 |
| 3 OR MORE AND LESS THAN 6 | 3 |
| 1 OR MORE AND LESS THAN 3 | 1 |
| 0 | 0 |
| ⋮ | ⋮ |

PROCESSOR, IMAGE PROCESSING METHOD, AND IMAGE PROCESSING PROGRAM

CROSS REFERENCE TO RELATED APPLICATIONS

This application claims priority from Japanese Application No. 2023-030563, filed on Feb. 28, 2023, the entire disclosure of which is incorporated herein by reference.

BACKGROUND

1. Technical Field

The present disclosure relates to a processor, an image processing method, and a non-transitory storage medium storing an image processing program.

2. Related Art

A glasses-type display device such as an augmented reality (AR) device that allows a user to visually recognize a display image as a virtual image together with a real space is known in the related art.

In a brain of a user who uses the transmissive display device, a real image in which the real space is visually recognized and a displayed image in which a display image is visually recognized are combined, so that the user can visually recognize a state in which the displayed image overlaps the real image. The technology for processing the image quality of the display image and displaying it is known. For example, JP2012-174116A discloses a technology for performing image processing of adding predetermined noise based on imaging information to an object (display image) that is superimposed and displayed on an image of a real space.

SUMMARY

However, in the technology according to the related art, since image processing is performed on the display image regardless of the user, a user who visually recognizes the display image as a virtual image together with the real space may feel a sense of incongruity.

The present disclosure has been made in view of the above circumstances, and an object of the present disclosure is to provide a processor, an image processing method, and a non-transitory storage medium storing an image processing program that can cause a user to visually recognize a display image as a virtual image together with a real space as a whole without a sense of incongruity.

In order to achieve the above object, a processor according to a first aspect of the present disclosure, which is included in a glasses-type display device that is capable of allowing a user to visually recognize a display image displayed on a display unit as a virtual image together with a real space, performs image processing based on a visual characteristic of the user on the display image, and displays the display image after the image processing on the display unit.

According to a processor of a second aspect of the present disclosure, in the processor of the first aspect, the image processing is processing of converting an image quality of the display image into an image quality simulating the visual characteristic of the user.

According to a processor of a third aspect of the present disclosure, in the processor of the second aspect, the processor changes a degree of simulating the visual characteristic according to a preset condition.

According to a processor of a fourth aspect of the present disclosure, in the processor of the third aspect, in a case in which the condition is satisfied, the processor reduces the degree of simulating the visual characteristic as compared with a case in which the condition is not satisfied.

According to a processor of a fifth aspect of the present disclosure, in the processor of the fourth aspect, the condition is a condition based on at least one of an attribute of the display image or an attribute of the user.

According to a processor of a sixth aspect of the present disclosure, in the processor of the fifth aspect, the attribute includes at least one of a display content or an evaluation value predetermined according to the display content.

According to a processor of a seventh aspect of the present disclosure, in the processor of the sixth aspect, the display content includes at least one of a character or a pattern.

According to a processor of an eighth aspect of the present disclosure, in the processor of the seventh aspect, the visual characteristic is visual acuity of the user, and the image processing is processing of blurring the display image.

According to a processor of a ninth aspect of the present disclosure, in the processor of the eighth aspect, the processor determines a degree of blurriness of the display image based on a distance from the user to an insertion position of the virtual image in the real space and the visual acuity.

According to a processor of a tenth aspect of the present disclosure, in the processor of the ninth aspect, the processor detects the visual acuity of the user and performs the image processing according to the detected visual acuity.

In order to achieve the above object, an image processing method according to an eleventh aspect of the present disclosure is a method comprising: via a processor included in a glasses-type display device that is capable of allowing a user to visually recognize a display image displayed on a display unit as a virtual image together with a real space, performing image processing based on a visual characteristic of the user on the display image; and displaying the display image after the image processing on the display unit.

In order to achieve the above object, a non-transitory storage medium storing an image processing program according to a twelfth aspect of the present disclosure is a program causing a processor, which is included in a glasses-type display device that is capable of allowing a user to visually recognize a display image displayed on a display unit as a virtual image together with a real space, to execute a process comprising: performing image processing based on a visual characteristic of the user on the display image; and displaying the display image after the image processing on the display unit.

According to the present disclosure, the display image can be visually recognized by the user as a virtual image together with the real space as a whole without a sense of incongruity.

BRIEF DESCRIPTION OF THE DRAWINGS

FIG. 8 is a diagram for explaining an example of correspondence relationship information.

FIG. 9 is a flowchart showing an example of image processing executed by the processor according to the first embodiment.

FIG. 10 is a block diagram showing an example of a configuration of the processor according to a second embodiment.

FIG. 11 is a diagram for explaining an example of evaluation value information representing a correspondence relationship between an attribute and an evaluation value.

FIG. 12 is a diagram for explaining an example of reduction amount information representing a correspondence relationship between an evaluation value and an amount of reduction.

DESCRIPTION OF EMBODIMENTS

Hereinafter, examples of an embodiment for implementing the technology of the present disclosure will be described in detail with reference to the drawings.

First Embodiment

Figure 1:
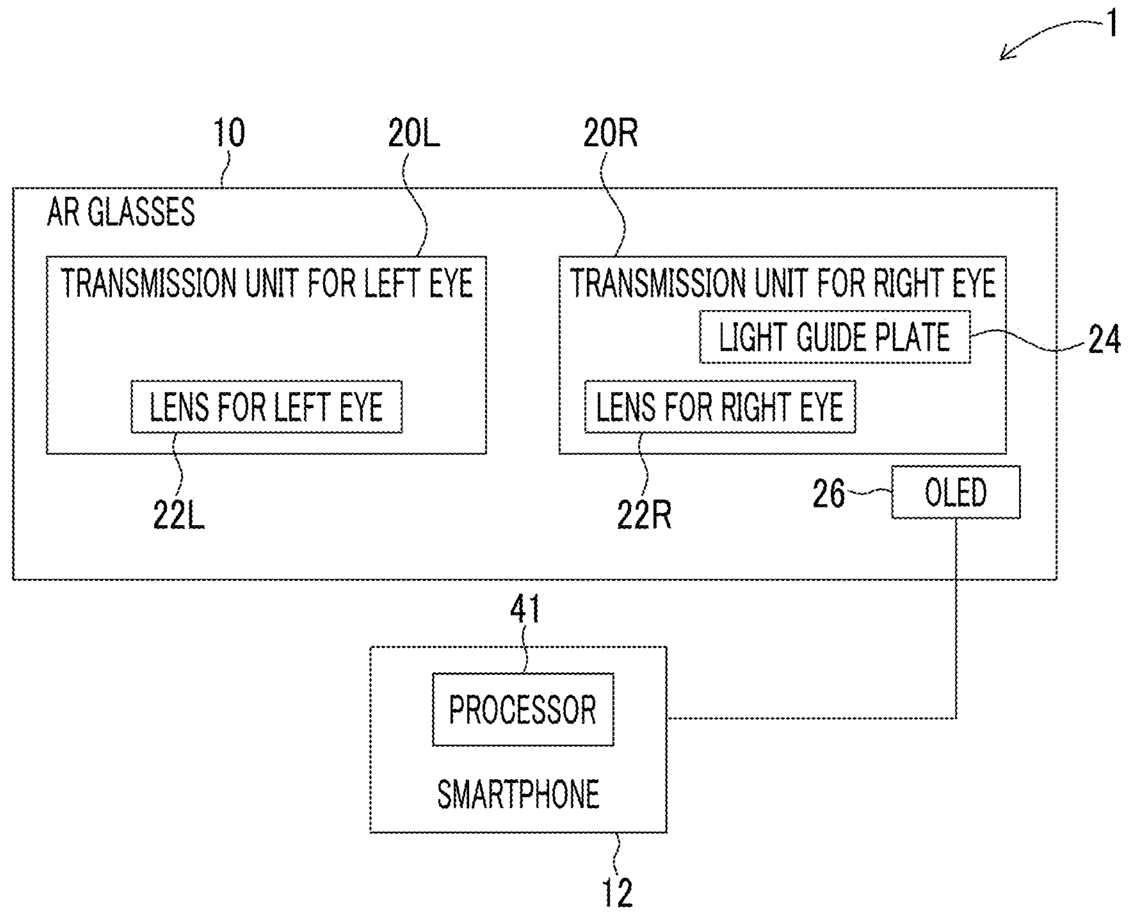
FIG. 1 is a configuration diagram showing an example of a configuration of a glasses-type information display device according to a first embodiment.

The configuration of a glasses-type information display device 1 according to the present embodiment will be described with reference to FIG. 1. As shown in FIG. 1, the glasses-type information display device 1 according to the present embodiment comprises augmented reality (AR) glasses 10 and a smartphone 12.

Figure 2:
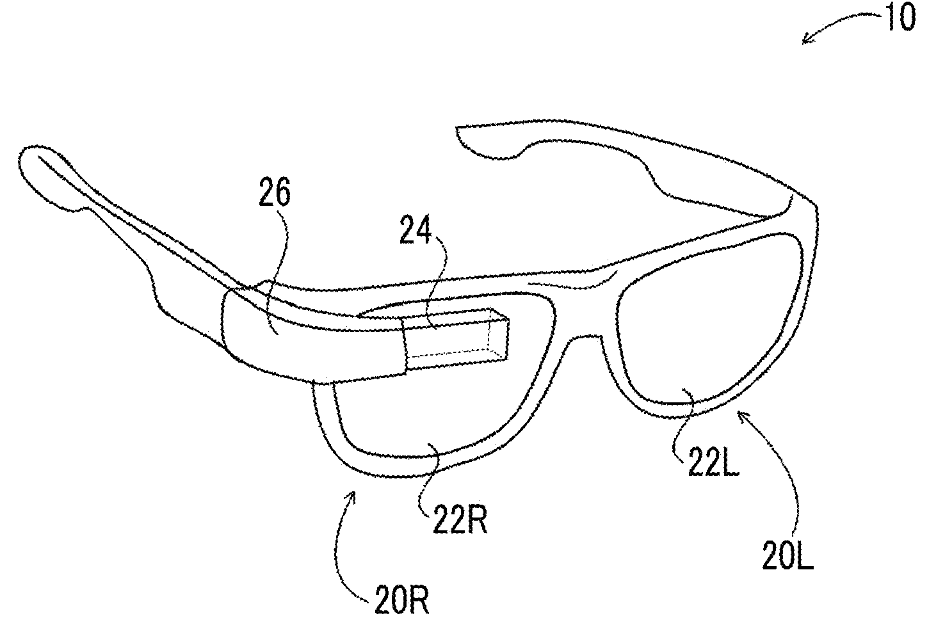
FIG. 2 is a perspective view showing an example of AR glasses according to the embodiment.

The AR glasses 10 are a device that allows a user to visually recognize a projection image, which is projected from an organic light emitting diode (OLED) 26, in a state in which the projection image is superimposed on a real image. FIG. 2 is a perspective view of an example of the AR glasses 10 of the present embodiment. As shown in FIGS. 1 and 2, the AR glasses 10 comprise a pair of a transmission unit 20L for a left eye and a transmission unit 20R for a right eye, and an OLED 26.

The OLED 26 projects the projection image, which represents information, onto the transmission unit 20R for a right eye in order to insert information into the visual field of a real image, which is visually recognized by the user through the transmission unit 20R for a right eye, in a superimposed manner.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye, is guided to the right eye of the user, and is visually recognized as a projected image with the right eye. In addition, the user visually recognizes a real space, which is shown through the lens 22R for a right eye, as a real image with the right eye. The light guide plate 24 of the AR glasses 10 of the present embodiment is an example of a display unit of the present disclosure, and the projection image of the present embodiment is an example of a display image of the present disclosure.

For this reason, while the projection image is projected from the OLED 26, the visually-recognized image visually recognized with the right eye of the user is in a state in which the projected image according to the projection image projected onto the light guide plate 24 is superimposed on the real image representing the real space shown through the lens 22R for a right eye. In addition, while the projection image is not projected from the OLED 26, the visually-recognized image visually recognized by the user is the real image that represents the real space shown through the lens 22R for a right eye and the light guide plate 24.

Meanwhile, the transmission unit 20L for a left eye includes a lens 22L for a left eye. The user visually recognizes the real space, which is shown through the lens 22L for a left eye, with the left eye.

On the other hand, the smartphone 12 comprises a processor 41. The CPU 40 of the present embodiment controls the OLED 26 to project the projection image onto the light guide plate 24 from the OLED 26.

Figures 3, 4:
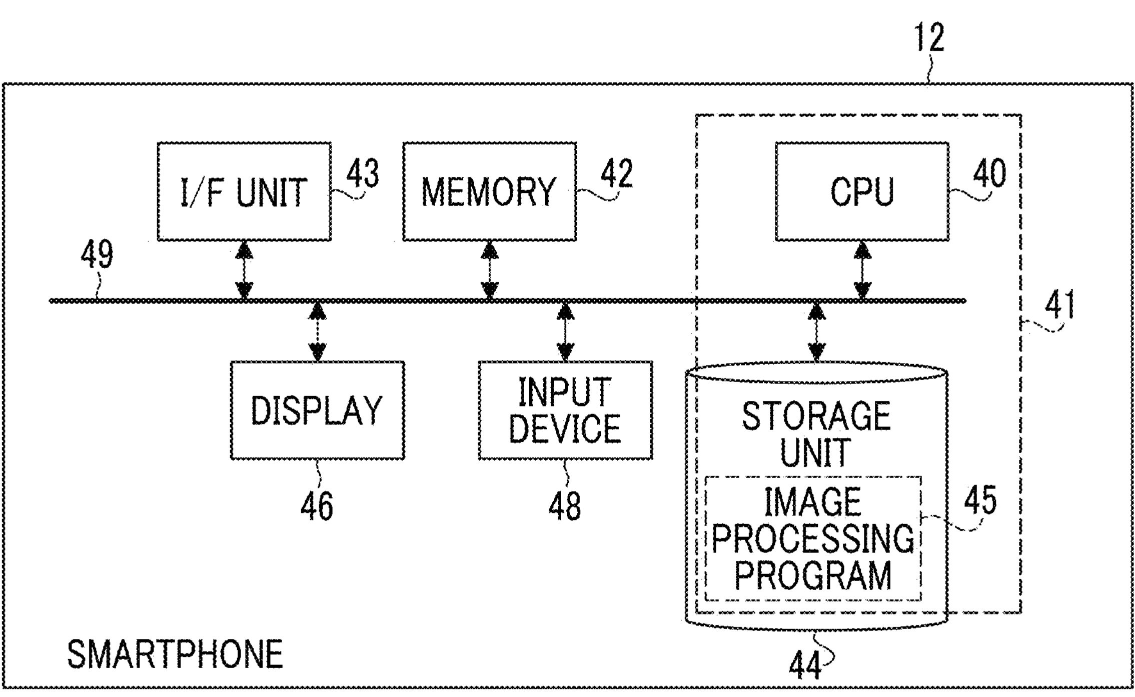
FIG. 3 is a block diagram showing an example of a hardware configuration of the smartphone according to the first embodiment.
FIG. 4 is a block diagram showing an example of a configuration of the processor according to the first embodiment.

FIG. 3 shows a block diagram showing an example of a hardware configuration of the smartphone 12. As shown in FIG. 3, the smartphone 12 comprises the CPU 40, a memory 42, an interface (I/F) unit 43, a storage unit 44, a display 46, and an input device 48. The CPU 40, the memory 42, the I/F unit 43, the storage unit 44, the display 46, and the input device 48 are connected to each other via a bus 49, such as a system bus or a control bus, such that various types of information can be given and received therebetween.

The CPU 40 reads out various programs, which include an image processing program 45 stored in the storage unit 44, to the memory 42 and performs processing corresponding to the program read out. Accordingly, the CPU 40 performs a control of the display of the projected image by the OLED 26. As an example, the processor 41 of the present embodiment is composed of a combination of the CPU 40 and the image processing program 45. The memory 42 is a work memory that is used in a case in which the CPU 40 performs processing.

The image processing program 45 executed in the CPU 40 is stored in the storage unit 44. In addition, the image data (not shown) of the projection image projected from the OLED 26, various other types of information, and the like are also stored in the storage unit 44. Specific examples of the storage unit 44 include a hard disk drive (HDD), a solid state drive (SSD), and the like.

The I/F unit 43 communicates various types of information with each of the OLED 26 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. The input device 48 is not particularly limited, and examples of the input device 48 include a keyboard, a touch pen, a mouse, and the like. A touch panel display in which the display 46 and the input device 48 are integrated with each other is employed in the smartphone 12.

In addition, the function of the processor 41 of the smartphone 12 of the present embodiment will be described. FIG. 4 shows a functional block diagram showing an example of a configuration related to the function of the processor 41 of the present embodiment. As shown in FIG. 4, the processor 41 comprises a visual characteristic information acquisition unit 50, a projection image acquisition unit 52, an image processing unit 54, and a display controller 56. As an example, in the processor 41 of the present embodiment, the CPU 40 executes the image processing program 45 stored in the storage unit 44, so that the CPU 40 functions as the visual characteristic information acquisition unit 50, the projection image acquisition unit 52, the image processing unit 54, and the display controller 56.

The visual characteristic information acquisition unit 50 has a function of acquiring visual characteristic information 60. The visual characteristic information 60 is information that represents the visual characteristic of the user of the glasses-type information display device 1. In the present embodiment, a case in which the visual characteristic represented by the visual characteristic information 60 is the visual acuity of the user will be described as a specific example. More specifically, the visual characteristic information 60 is a numerical value that represents the visual acuity of the eye (in the present embodiment, the right eye) that visually recognizes the projection image 74 projected onto the light guide plate 24 of the AR glasses 10.

For example, in the present embodiment, the visual acuity of the right eye input by the user using the input device 48 is stored in the storage unit 44 as the visual characteristic information 60, and the visual characteristic information acquisition unit 50 acquires the visual characteristic information 60 from the storage unit 44. The visual characteristic information acquisition unit 50 outputs the acquired visual characteristic information 60 to the image processing unit 54.

The projection image acquisition unit 52 has a function of acquiring image data of the projection image 74 projected by the OLED 26. The projection image 74 is an image that, for example, provides a clearer visually-recognized image than a visually-recognized image visually recognized in a case in which the object present in the real space is visually recognized by a general human in a normal image quality state without image processing which will be described later. Specific examples of the projection image 74 include computer graphics. In the present embodiment, an insertion position of the projected image in the real space by the projection image 74 is determined, and the insertion position is associated with the projection image 74. Examples of the insertion position of the projected image in the real space include a position in the real space represented by a distance from the user (AR glasses 10), a position represented by global coordinates, and the like.

In the present embodiment, as an example, since the image data of the projection image 74 is stored in the storage unit 44, the projection image acquisition unit 52 acquires the image data of the projection image 74 from the storage unit 44. Regardless of the present embodiment, image data of the projection image 74 may be acquired from an external device of the smartphone 12 via the I/F unit 43. The projection image acquisition unit 52 outputs the image data of the projection image 74 to the image processing unit 54. Hereinafter, the image data of the projection image 74 is simply referred to as the projection image 74, and for example, acquiring the image data of the projection image 74 is referred to as acquiring the projection image 74.

The image processing unit 54 has a function of performing image processing based on the visual characteristics of the user on the projection image 74, and performs image processing of converting the image quality of the projection image 74 into an image quality simulating the visual characteristics of the user. In other words, the image processing unit 54 performs image processing of converting the image quality of the projection image 74 into the image quality of the visually-recognized image that is visually recognized in a case in which the user views it with the naked eye.

As shown in FIG. 4, the image processing unit 54 of the present embodiment has a blurriness degree determination unit 55. The blurriness degree determination unit 55 determines a degree of image processing to be performed on the projection image 74, specifically, a degree of blurriness to blur the projection image 74, based on the visual characteristic information acquisition unit 50. The image processing unit 54 performs image processing on the projection image 74 according to the degree of blurriness determined by the blurriness degree determination unit 55.

Figure 5:
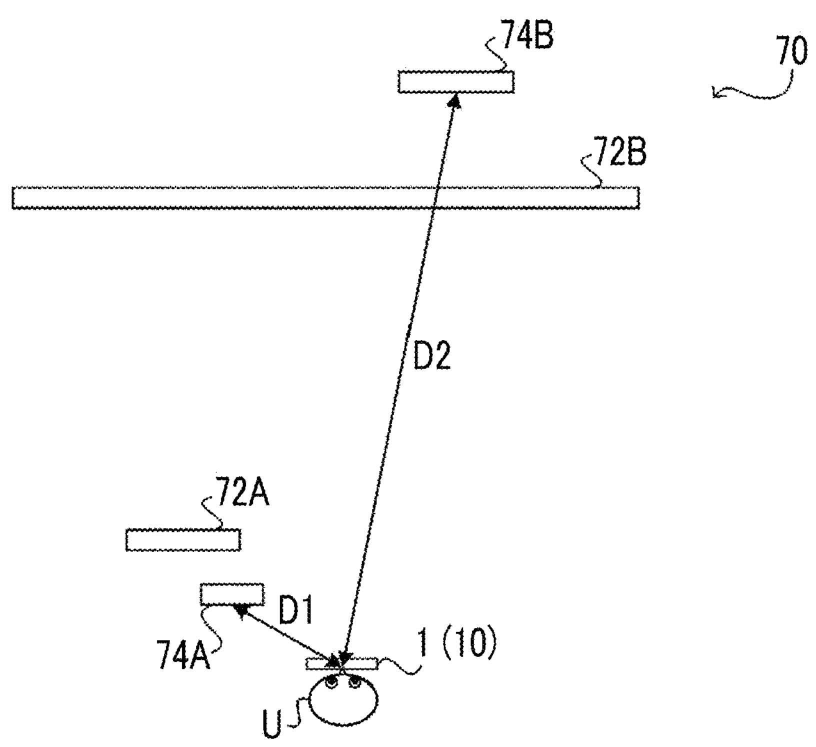
FIG. 5 is a diagram showing an example of a relationship between a user of the AR glasses, and objects present in a real space and virtual insertion positions of a projection image.

The image processing that is performed by the image processing unit 54 on the projection image 74 will be described in detail with reference to FIGS. 5 to 8. FIG. 5 shows an example of a relationship between a user U of the glasses-type information display device 1 (AR glasses 10), and objects 72A and 72B present in the real space 70 and virtual insertion positions of the projection images 74A and 74B. The object 72A present in the real space 70 is an object that is present at a position relatively close to the user U, and is, here, referred to as a "house". The object 72B present in the real space 70 is an object that is present at a position relatively far away from the user U, and is, here, a plurality of objects such as a building, a mountain, a bus stop, and a tree. The plurality of objects are collectively referred to as a "background". In practice, the plurality of objects included in the "background" may have different distances from the user U. However, for convenience of description, as shown in FIG. 5, the plurality of objects are assumed to be present at the same position.

On the other hand, the projection image 74A is a projection image in which a virtual insertion position is present at a position relatively close to the user U, and it is an image of "panda" here. The projection image 74B is a projection image in which a virtual insertion position is present at a position relatively far away from the user U, and it is an image of "moon" here. As shown in FIG. 5, a distance D1 between a virtual insertion position of the projection image 74A and the user U is shorter than a distance D2 between a virtual insertion position of the projection image 74B and the user U.

Figure 6:
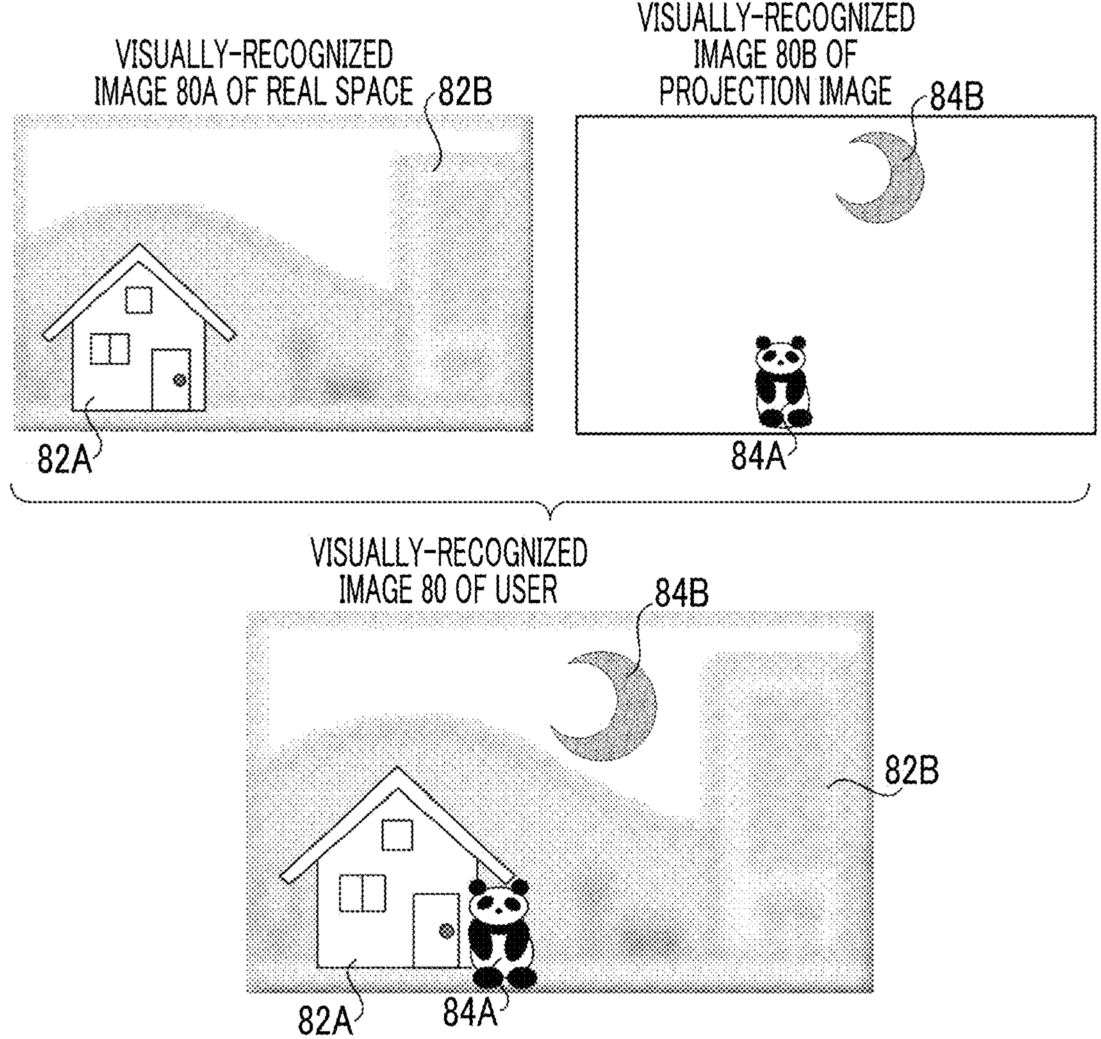
FIG. 6 is a diagram for explaining image processing performed on a projection image by an image processing unit.

As shown in FIG. 6, in the glasses-type information display device 1, the projection images 74A and 74B can be visually recognized by the user U as projected images 84A and 84B which are virtual images together with the real space 70. In other words, the user U of the glasses-type information display device 1 visually recognizes, through the AR glasses 10, the projection images 74A and 74B projected onto the light guide plate 24 together with the objects 72A and 72B present in the real space 70. In this case, since the objects 72A and 72B present in the real space 70 are visually recognized with the naked eye, a real image 82A and a real image 82B depend on the visual characteristics of the user. In the following, a case in which the user is nearsighted and has visual acuity of about 0.5 as a visual characteristic will be described. As shown in FIG. 6, a visually-recognized image 80A in which the real space 70 is visually recognized includes the real image 82A obtained by visually recognizing the object 72A and the real image 82B obtained by visually recognizing the object 72B. Since the object 72A is present at a position relatively close to the user U, the real image 82A is visually recognized as a clear image having no blurriness. On the other hand, since the object 72B is present at a position relatively far away from the user U, the real image 82B is visually recognized as a blurred image. In this way, the object present in the real space 70 is visually recognized by the user U as a real image with blurriness to a degree corresponding to the distance to the user U. In the present embodiment, even a real image without blurriness, such as the real image 82A, is treated as a real image with a degree of blurriness of "0".

On the other hand, the projected image 84A obtained by visually recognizing the projection image 74A and the projected image 84B obtained by visually recognizing the projection image 74B are included in the visually-recognized image 80B. As described above, the projected images 84A and 84B are images that provide a clearer visually-recognized image than a visually-recognized image visually recognized in a case in which the object present in the real space is visually recognized by a general human in a normal image quality state. Therefore, as shown in FIG. 6, the projected images 84A and 84B can be visually recognized as high-quality, blurriness-free images regardless of the distances D1 and D2 to the user U, that is, regardless of the visual characteristics of the user U.

In this case, as a result, as shown in FIG. 6, in the visually-recognized image 80 visually recognized by the user U, the real images 82A and 82B having image quality in which the blurriness occurs according to the visual characteristics of the user and the projected images 84A and 84B having the image quality which is not related to visual characteristics of the user are visually recognized. However, since the virtual insertion position of the projection image 74B is a position relatively far away from the user U, in a case in which the object is actually present at the virtual insertion position of the projection image 74B, the visually-recognized image obtained by visually recognizing the object is to be an image in which the blurriness occurs, such as the real image 82B corresponding to the object 72B.

In the example shown in FIG. 6, while the real image 82B is blurred, the projected image 84B is not blurred. Therefore, the visually-recognized image 80 as a whole is visually recognized by the user U in a state in which a sense of incongruity occurs.

Figure 7:
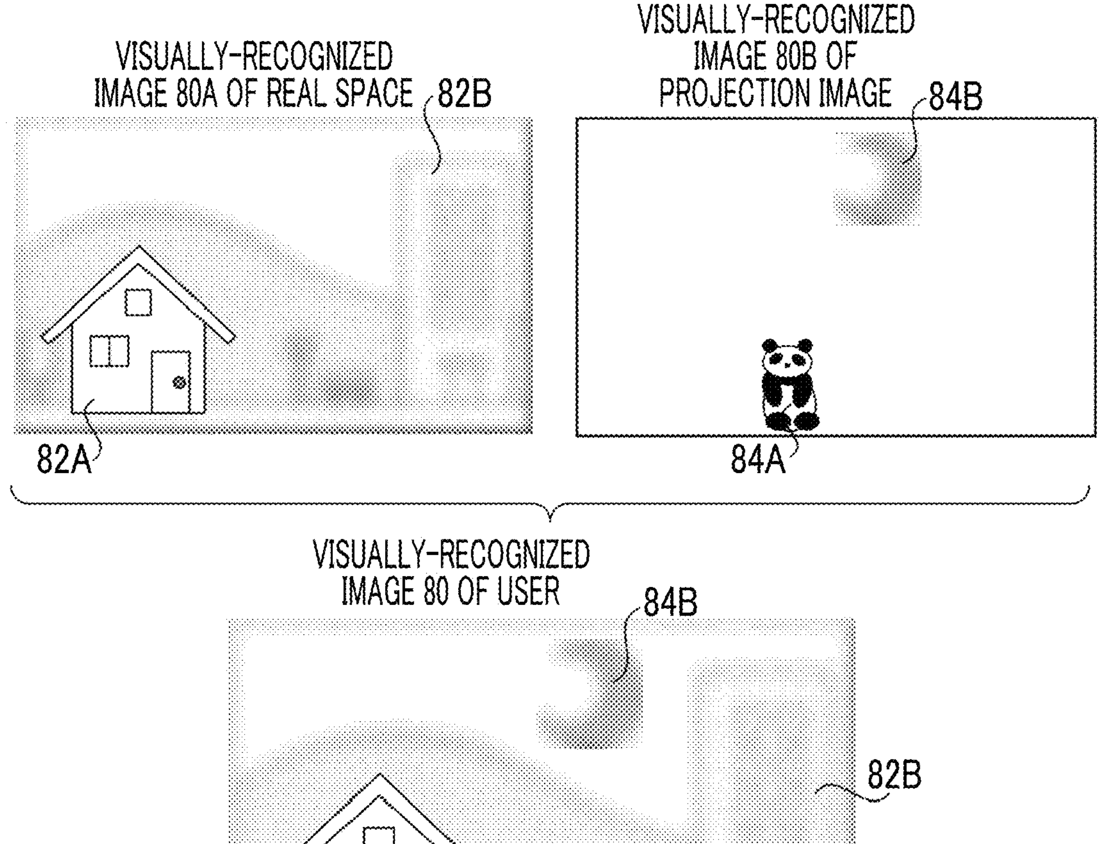
FIG. 7 is a diagram for explaining image processing performed on the projection image by the image processing unit.

Therefore, the image processing unit 54 of the present embodiment performs image processing for changing the image quality of the projection images 74A and 74B in a room simulating the visual characteristics of the user U and for causing blurriness. As shown in FIG. 7, the image processing unit 54 performs image processing on the projection image 74A in which the virtual insertion position is a position relatively close to the user U to obtain an image in which the degree of blurriness is 0 or an image having a relatively low degree of blurriness. Accordingly, the projected image 84A is visually recognized by the user U in a state in which blurriness does not occur or the degree of blurriness is relatively low. On the other hand, the image processing unit 54 performs the image processing on the projection image 74B in which the virtual insertion position is a position relatively far away from the user U to obtain an image in which the degree of blurriness is relatively high. Accordingly, the projected image 84B is visually recognized by the user U as an image in which the blurriness occurs.

In this case, as a result, as shown in FIG. 7, in the visually-recognized image 80 visually recognized by the user U, the real images 82A and 82B having image quality in which the blurriness occurs according to the visual characteristics of the user and the projected images 84A and 84B having the image quality in which the blurriness occurs according to the visual characteristics of the user are visually recognized. Therefore, the visually-recognized image 80 is visually recognized by the user U as a whole without a sense of incongruity.

The blurriness degree determination unit 55 of the image processing unit 54 determines the degree of blurriness to be caused in the projection image 74 according to the visual characteristics of the user. As an example, the blurriness degree determination unit 55 of the present embodiment determines the degree of blurriness to be caused in the projection image 74 by referring to correspondence relationship information representing a correspondence relationship between the distance between the virtual insertion position of the projected image by the projection image 74 and the user, the visual acuity of the user, and the degree of blurriness to be caused. FIG. 8 shows an example of correspondence relationship information 64 referred to by the blurriness degree determination unit 55. In the example shown in FIG. 8, as the numerical value representing the degree of blurriness increases, it represents the higher degree of blurriness, resulting in a more blurred image. The correspondence relationship information 64 may be stored in the storage unit 44 of the smartphone 12 or may be added to the projection image 74, and the projection image acquisition unit 52 may acquire the correspondence relationship information 64 together with the projection image 74.

The image processing unit 54 converts the image quality of the projection image 74 according to the degree of blurriness determined by the blurriness degree determination unit 55, and outputs the projection image 74 whose image quality is changed to the display controller 56. The specific method by which the image processing unit 54 converts the image quality of the projection image 74 according to the degree of blurriness determined by the blurriness degree determination unit 55 is not particularly limited, and known technologies can be used. In this case, image processing using known technologies includes a method of performing image processing to change the depth of field based on a predetermined rule, a method of reducing image quality described in JP2019-102828A, and a method of performing blurriness image processing using a trained neural network.

The display controller 56 has a function of performing a control to display the projection image 74. Specifically, the display controller 56 outputs the image data of the projection image 74 subjected to the image processing by the image processing unit 54 to the OLED 26, and projects the projection image 74 from the OLED 26 to perform a control to display the projected image.

Next, the action of the processor 41 of the present embodiment will be described. FIG. 9 shows a flowchart showing an example of the flow of image processing by the processor 41 of the present embodiment. As an example, in the smartphone 12 of the present embodiment, the CPU 40 of the processor 41 executes the image processing program 45 stored in the storage unit 44 to perform the image processing of which an example is shown in FIG. 9 in a case in which an instruction to start projection, which is input using the input device 48 by the user, is received.

In Step S100 in FIG. 9, the visual characteristic information acquisition unit 50 acquires the visual characteristic information 60 as described above. Specifically, the visual characteristic information acquisition unit 50 acquires a value representing the visual acuity of the user as the visual characteristic information 60.

In the next step S102, as described above, the projection image acquisition unit 52 acquires the projection image 74. In a case in which the correspondence relationship information 64 is added to the projection image 74, the projection image acquisition unit 52 acquires the correspondence relationship information 64 together with the projection image 74.

In the next step S104, the blurriness degree determination unit 55 of the image processing unit 54 determines the degree of blurriness for converting the image quality, as described above. Specifically, the blurriness degree determination unit 55 determines the degree of blurriness to be caused by referring to the correspondence relationship information 64 based on the visual characteristic information 60 (the visual acuity of the user) acquired in Step S100 and the insertion position (the distance from the user) associated with the projection image 74 acquired in Step S102.

In the next step S106, as described above, the image processing unit 54 performs image processing of converting the image quality of the projection image 74 according to the degree of blurriness determined in Step S104. Accordingly, the projected image obtained in a case in which the user visually recognizes the projection image 74 is a visually-recognized image corresponding to the visual characteristics of the user.

In the next step S108, the display controller 56 outputs the image data of the projection image 74 to the OLED 26 as described above, and instructs the OLED 26 to start the projection so that the projection image 74 is displayed. Accordingly, the user can visually recognize the projection image 74 in a state corresponding to the visual characteristics of the user together with the real space.

In the next step S110, the display controller 56 determines whether or not to end the display of the projection image 74. For example, in a case in which the display controller 56 receives an instruction to end the display input by the user using the input device 48 of the smartphone 12, the display controller 56 determines to end the display of the projection image 74. In a case in which the display of the projection image 74 is not ended, the determination in Step S110 is a negative determination, and the processing proceeds to Step S112.

In Step S112, the display controller 56 determines whether or not to change the projection image 74 during display. In a case in which the projection image 74 to be displayed is not changed, the determination in Step S112 is a negative determination, the processing returns to Step S110, and the projection image 74 currently being displayed is continued to be displayed as it is. On the other hand, in a case in which the projection image 74 to be displayed is changed, the determination in Step S112 is an affirmative determination, the processing returns to Step S102, and the processing of Steps S102 to S110 is repeated.

On the other hand, in a case in which the display of the projection image 74 is ended in Step S110, the determination is a negative determination, and the processing proceeds to Step S114.

In Step S114, the display controller 56 ends the display of the projection image. Specifically, the display controller 56 ends the output of the image data of the projection image 74. Accordingly, the display of the projection image 74 is ended. In a case in which the processing of Step S114 is ended, the image processing shown in FIG. 9 is ended.

Second Embodiment

An aspect in which the image processing unit 54 converts the image quality of the projection image 74 into the image quality simulating the visual characteristics of the user has been described in the first embodiment. However, there are cases in which it is desired to display the projection image 74 having an image quality that is not related to the visual characteristics of the user. Therefore, in the present embodiment, an aspect in which the degree of simulating the visual characteristics in the image processing performed on the projection image 74 is changed according to a preset condition will be described.

As an example, in the present embodiment, as shown in FIG. 10, an aspect in which attribute information 75 representing an attribute of the projection image 74 is assigned to the projection image 74, and a degree of simulating the visual characteristics according to a condition based on the attribute is changed will be described. In FIG. 10, examples of the attribute of the projection image 74 include display content such as "character" and "pattern" and meaning of the display content. In this case, in a case of the projection image 74B shown in FIG. 6 described above, the attribute thereof is "moon". In addition, examples of the attribute of the projection image 74 include a degree of danger, importance, and the like corresponding to the image represented by the projection image 74. In this case, for example, in a case in which the pattern of the projection image 74 is "steps", a numerical value representing the degree of danger or the importance to be shown to the user, such as "degree of danger=10", is assigned as the attribute of the projection image 74.

The projection image acquisition unit 52 of the present embodiment acquires the projection image 74 to which the attribute information 75 is assigned, and outputs the projection image 74 to which the attribute information 75 is assigned to the image processing unit 54. The number of attributes represented by the attribute information 75 is not limited to one, and may be plural.

The blurriness degree determination unit 55 of the image processing unit 54 changes the degree of blurriness according to the attribute represented by the attribute information 75. In the present embodiment, an evaluation value for changing the degree of blurriness is associated with the attribute, and the blurriness degree determination unit 55 reduces the degree of blurriness according to the evaluation value. Specifically, the blurriness degree determination unit 55 refers to evaluation value information 66 (refer to FIG. 11) representing a correspondence relationship between the attribute and the evaluation value for reducing the degree of blurriness, and derives an evaluation value of the projection image 74 based on the attribute represented by the attribute information 75. For example, in a case in which the attributes represented by the attribute information 75 are "character" and "bus stop", the blurriness degree determination unit 55 derives 15(6+9) as the evaluation value with reference to the evaluation value information 66 shown in FIG. 11. The present disclosure is not limited to the present embodiment, and the evaluation value itself may be adopted as the attribute of the projection image 74.

In addition, the blurriness degree determination unit 55 determines the amount of reduction of the degree of blurriness based on the derived evaluation value. In the present embodiment, the amount of reduction of the degree of blurriness is predetermined according to the evaluation value, and the blurriness degree determination unit 55 determines the amount of reduction of the blurriness based on the derived evaluation value with reference to the reduction amount information 68 (refer to FIG. 12) representing the correspondence relationship between the degree of blurriness and the amount of reduction. For example, as described above, in a case in which "15" is derived as the evaluation value, the blurriness degree determination unit 55 derives "10" as the amount of reduction with reference to the reduction amount information 68 shown in FIG. 12. The amount of reduction of "0" in the reduction amount information 68 shown in FIG. 12 represents that the degree of blurriness determined based on the visual characteristics of the user is not reduced and is used as is.

The blurriness degree determination unit 55 reduces the degree of blurriness of the projection image 74, which is determined based on the visual characteristics of the user, based on the determined amount of reduction. In a case in which the degree of blurriness of the projection image 74, which is determined based on the visual characteristics of the user, is equal to the determined amount of reduction or is smaller than the amount of reduction, the projection image 74 is not blurred regardless of the visual characteristics of the user. That is, the blurriness degree determination unit 55 does not perform image processing that causes the blurriness on the projection image 74.

The evaluation value information 66 and the reduction amount information 68 described above may be stored in, for example, the storage unit 44 or may be stored in an external device, and the blurriness degree determination unit 55 may be in a form referred from an external device. In addition, for example, the evaluation value information 66 and the reduction amount information 68 may be added to the projection image 74 as in the attribute information 75.

Figure 13:
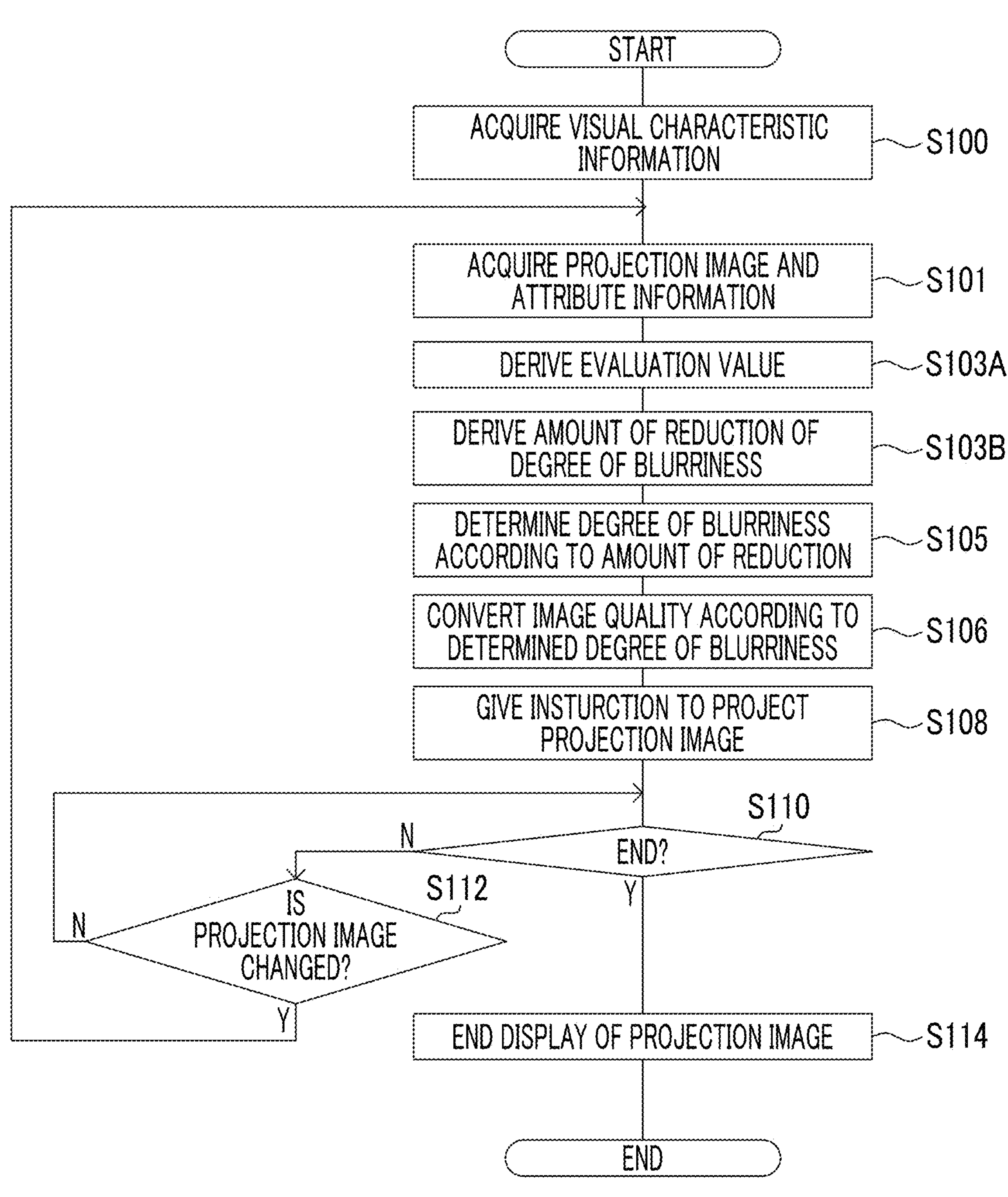
FIG. 13 is a flowchart showing an example of image processing executed by the processor according to the second embodiment.

FIG. 13 shows a flowchart showing an example of the flow of image processing by the processor 41 of the present embodiment. The image processing of the present embodiment is different from the image processing of the first embodiment (refer to FIG. 9) in that the processing of Steps S101, S103A, S103B, and S105 is included instead of Steps S102 and S104.

In Step S101 in FIG. 13, the projection image acquisition unit 52 acquires the projection image 74 and the attribute information 75 as described above, and outputs the acquired projection image 74 and attribute information 75 to the image processing unit 54.

In the next step S103A, as described above, the blurriness degree determination unit 55 derives the evaluation value corresponding to the attribute represented by the attribute information 75 with reference to the evaluation value information 66 shown in FIG. 11.

In the next step S103B, as described above, the blurriness degree determination unit 55 derives the amount of reduction corresponding to the evaluation value derived in Step S103A with reference to the reduction amount information 68 shown in FIG. 12.

In the next step S105, as described above, the blurriness degree determination unit 55 determines the degree of blurriness according to the amount of reduction derived in Step S103B. Specifically, the blurriness degree determination unit 55 derives the degree of blurriness to be caused by referring to the correspondence relationship information 64 based on the visual characteristic information 60 (the visual acuity of the user) acquired in Step S100 and the insertion position (the distance from the user) associated with the projection image 74 acquired in Step S101. Further, the blurriness degree determination unit 55 determines a value obtained by reducing the derived degree of blurriness according to the amount of reduction derived in Step S103B as the degree of blurriness applied to the projection image 74.

In this way, since the smartphone 12 of the present embodiment changes the degree of blurriness based on the attributes of the projection image 74, it is possible to cause the user to appropriately recognize an image (information) regardless of the visual characteristics of the user.

In the present embodiment, the degree of blurriness, which is determined according to the visual characteristics of the user, is reduced by the condition based on the attributes of the projection image 74, but the condition for reducing the degree of blurriness is not limited to the condition based on the attributes of the projection image 74. For example, the condition may be a condition based on an attribute of the user. Examples of the attribute of the user include an attribute based on an age of the user, such as "young age", "adult age", and "old age". For example, in a case in which the condition based on the attribute of the projection image 74 and the condition based on the attribute of the user are combined, the evaluation value derived based on the attribute of the projection image 74 as described above may be changed in accordance with the attribute of the user. As a specific example, in a case in which the attribute of the user is "old age", the evaluation value is increased by a predetermined amount, and the amount of reduction of the degree of blurriness is increased to prevent blurriness from occurring in the projection image 74.

As described above, the glasses-type information display device 1 according to each of the above-described embodiments can allow the user to visually recognize the projection image 74 projected onto the light guide plate 24 of the AR glasses 10 as a projected image together with the real space. The image processing unit 54 of the glasses-type information display device 1 performs image processing based on the visual characteristics of the user on the projection image 74, and the display controller 56 causes the light guide plate 24 to display the projection image 74 after the image processing.

Accordingly, in the glasses-type information display device 1 of each of the above-described embodiments, the user can visually recognize the projection image 74 with the same way as the visual characteristic of visually recognizing the object present in the real space. Therefore, according to the glasses-type information display device 1 of each of the above-described embodiments, the projection image 74 can be visually recognized by the user as a projected image together with the real space as a whole without a sense of incongruity.

In each of the above-described embodiments, the case in which the visual characteristic of the user is the visual acuity of the user has been described, but the visual characteristic of the user is not limited to the visual acuity of the user, and instead of the visual acuity of the user or in addition to the visual acuity of the user, other visual characteristics may be used. Examples of other visual characteristics include chroma saturation and lightness, which are generally referred to as visual characteristics. In addition, the other visual characteristics may be visual characteristics estimated from the user's own attributes such as race, age, and gender. In addition, even in a case in which the visual acuity of the user is used as the visual characteristic, the present disclosure is not limited to the aspect in which a numerical value representing the visual acuity is used as in each of the above-described embodiments, but it may be an aspect in which, for example, types of nearsightedness, farsightedness, astigmatism, and the degree (strength) of the same are used.

In addition, in each of the above-described embodiments, the visual acuity of the eye that visually recognizes the projection image 74 is used as the visual acuity of the user, the present disclosure is not limited to the present embodiment, and visual acuity of the eye that visually recognizes only the real space may be used and an average value of the visual acuity of both eyes may be used.

Figure 14:
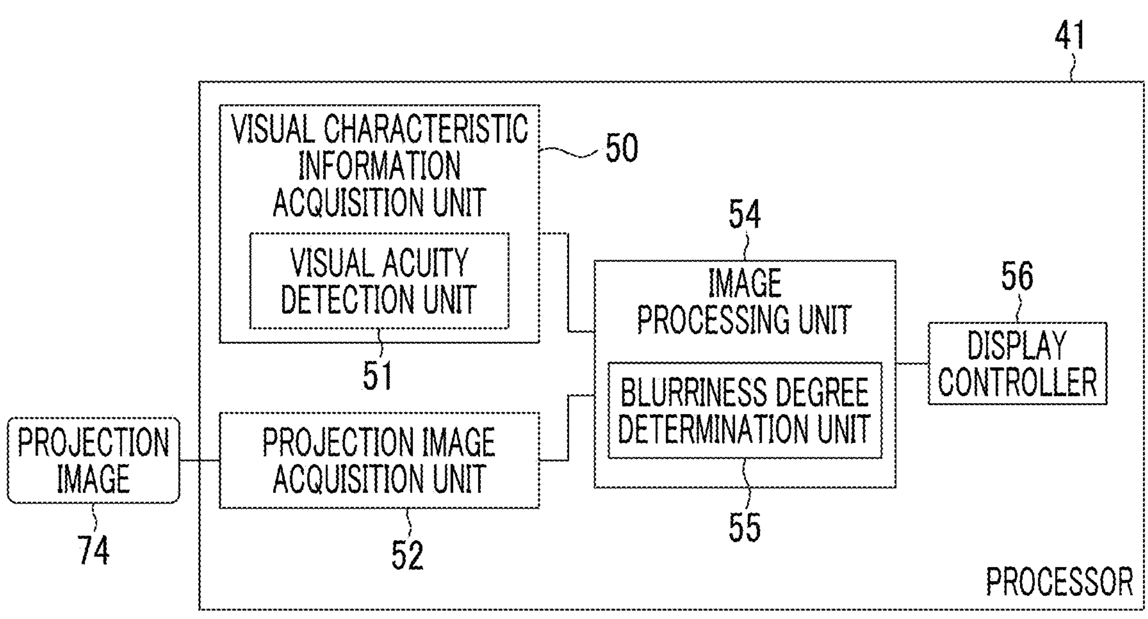
FIG. 14 is a block diagram showing an example of a configuration of a processor of another embodiment.

In addition, in each of the above-described embodiments, an aspect of acquiring the visual acuity input by the user as the visual characteristic information 60 has been described as a method of acquiring the visual characteristic information 60 representing the visual acuity via the visual characteristic information acquisition unit 50. The method of acquiring the visual acuity (visual characteristic information 60) via the visual characteristic information acquisition unit 50 is not limited to the present embodiment. For example, as shown in FIG. 14, the visual characteristic information acquisition unit 50 may have a visual acuity detection unit 51, and the visual acuity of the user detected by the visual acuity detection unit 51 may be acquired as the visual characteristic information 60. As the visual acuity detection unit 51 in this case, known technologies can be adopted such as projecting the projection image 74 for a Landolt ring or a red-green test from the OLED 26 of the AR glasses 10 and displaying it via the light guide plate 24, and detecting the visual acuity of the user based on these visible results input by the user using the input device 48.

In addition, in each of the above-described embodiments, the aspect in which the distance between the virtual insertion position of the projection image 74 and the user is not changed has been described, but an aspect in which the distance between the virtual insertion position of the projection image 74 and the user is changed may be used. In this case, the glasses-type information display device 1 comprises a global positioning system (global positioning satellite (GPS)) function and recognizes a position of the AR glasses 10 (user). The blurriness degree determination unit 55 calculates the distance between the virtual insertion position of the projection image 74 and the user based on the position of the AR glasses 10, and changes the degree of blurriness according to the change in the calculated distance.

In addition, in the glasses-type information display device 1 according to each of the above-described embodiments, the AR glasses 10 using the light guide plate 24 as a display unit have been described, but AR glasses 10 using a retinal display as a display unit may be used.

A shape of the glasses-type information display device is not limited to a general shape of glasses, an application, or a wearing portion. In addition, the glasses-type information display device may be a monocular type or a compound-eye type, and the aspect in which the projected image is visually recognized with one eye has been described in the above-described embodiment, but the projected image may be visually recognized with both eyes. A shape in which the left and right sides are connected like goggles may be used. In addition, it is not limited to devices wearing on a human head, like a so-called head-mounted display (for example, if a robot with the appearance of a dog simulates a function of a human, and the function of human eyes is achieved by a camera in the robot's knee, then the processor of the present disclosure is comprised in the image processing device mounted on the knee). Such an image processing device is also included in the technology of the present disclosure.

In addition, the AR glasses 10 may comprise some or all of the functions of the processor 41 of the above-described embodiment, or a device other than the glasses-type information display device 1 may comprise the functions.

In addition, the following various processors can be used in the above-described embodiment as the hardware structures of processing units, which perform various types of processing, such as the visual characteristic information acquisition unit 50, the projection image acquisition unit 52, the image processing unit 54, and the display controller 56. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). In addition, a plurality of processing units may be formed of one processor.

As an example in which a plurality of processing units are formed of one processor, first, as in the above-described embodiment, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

Furthermore, more specifically, electrical circuitry in which circuit elements, such as semiconductor elements, are combined can be used as the hardware structures of these various processors.

In addition, an aspect in which the image processing program 45 is stored (installed) in the storage unit 44 in advance has been described in each above-described embodiment, but the present disclosure is not limited thereto. The image processing program 45 may be provided in a form where the image processing program 45 is recorded in recording mediums, such as a compact disc read only memory (CD-ROM), a digital versatile disc read only memory (DVD-ROM), and a universal serial bus (USB) memory. In addition, the image processing program 45 may be downloaded from an external device through a network.

In regard to the embodiment described above, the following supplementary notes will be further disclosed.

Supplementary Note 1

A processor included in a glasses-type display device that is capable of allowing a user to visually recognize a display image displayed on a display unit as a virtual image together with a real space, in which the processor performs image processing based on a visual characteristic of the user on the display image, and displays the display image after the image processing on the display unit.

Supplementary Note 2

The processor according to Supplementary Note 1, in which the image processing is processing of converting an image quality of the display image into an image quality simulating the visual characteristic of the user.

Supplementary Note 3

The processor according to Supplementary Note 2, in which the processor changes a degree of simulating the visual characteristic according to a preset condition.

Supplementary Note 4

The processor according to Supplementary Note 3, in which, in a case in which the condition is satisfied, the processor reduces the degree of simulating the visual characteristic as compared with a case in which the condition is not satisfied.

Supplementary Note 5

The processor according to Supplementary Note 4, in which the condition is a condition based on at least one of an attribute of the display image or an attribute of the user.

Supplementary Note 6

The processor according to Supplementary Note 5, in which the attribute includes at least one of a display content or an evaluation value predetermined according to the display content.

Supplementary Note 7

The processor according to Supplementary Note 6, in which the display content includes at least one of a character or a pattern.

Supplementary Note 8

The processor according to any one of Supplementary Notes 1 to 7, in which the visual characteristic is visual acuity of the user, and the image processing is processing of blurring the display image.

Supplementary Note 9

The processor according to Supplementary Note 8, in which the processor determines a degree of blurriness of the display image based on a distance from the user to an insertion position of the virtual image in the real space and the visual acuity.

Supplementary Note 10

The processor according to Supplementary Note 8 or 9, in which the processor detects the visual acuity of the user and performs the image processing according to the detected visual acuity.

Supplementary Note 11

An image processing device included in a glasses-type display device that allows a user to visually recognize a display image displayed on a display unit as a virtual image together with a real space, the image processing device comprising at least one processor, in which the processor performs image processing based on a visual characteristic of the user on the display image, and displays the display image after the image processing on the display unit.

Supplementary Note 12

An image processing method comprising: via a processor included in a glasses-type display device that is capable of allowing a user to visually recognize a display image displayed on a display unit as a virtual image together with a real space, performing image processing based on a visual characteristic of the user on the display image; and displaying the display image after the image processing on the display unit.

Supplementary Note 13

An image processing program causing a processor, which is included in a glasses-type display device that is capable of allowing a user to visually recognize a display image displayed on a display unit as a virtual image together with a real space, to execute a process comprising: performing image processing based on a visual characteristic of the user on the display image; and displaying the display image after the image processing on the display unit.

What is claimed is:

1. A glasses-type display device that is capable of allowing a user to visually recognize a display image displayed on a display unit as a virtual image together with a real space, comprising:

the display unit that displays the display image as the virtual image, and a processor, wherein the processor performs image processing based on a visual characteristic of the user on the display image, wherein an amount of reduction of a degree of blurriness is derived by combining visual characteristic information and attribute information, wherein the attribute information includes display content and a degree of importance of the display content, and displays the display image after the image processing on the display unit.

2. The glasses-type display device according to claim 1, wherein the image processing is processing of converting an image quality of the display image into an image quality simulating the visual characteristic of the user.

3. The glasses-type display device according to claim 2, wherein the processor changes a degree of simulating the visual characteristic according to a preset condition.

4. The glasses-type display device according to claim 3, wherein, in a case in which the condition is satisfied, the processor reduces the degree of simulating the visual characteristic as compared with a case in which the condition is not satisfied.

5. The glasses-type display device according to claim 4, wherein the condition is a condition based on at least one of an attribute of the display image or an attribute of the user.

6. The glasses-type display device according to claim 5, wherein the attribute includes at least one of a display content or an evaluation value predetermined according to the display content.

7. The glasses-type display device according to claim 6, wherein the display content includes at least one of a character or a pattern.

8. The glasses-type display device according to claim 1, wherein the visual characteristic is visual acuity of the user, and the image processing is processing of blurring the display image.

9. The glasses-type display device according to claim 8, wherein the processor determines a degree of blurriness of the display image based on a distance from the user to an insertion position of the virtual image in the real space and the visual acuity.

10. The glasses-type display device according to claim 9, wherein the processor detects the visual acuity of the user and performs the image processing according to the detected visual acuity.

11. The glasses-type display device according to claim 1, wherein the image processing is performed based on the degree of blurriness, and when the degree of blurriness of a projection image, which is determined based on the visual characteristic of the user, is equal to the amount of reduction that is derived or is smaller than the amount of reduction that is derived, the projection image is not blurred regardless of the visual characteristic of the user, and a blurriness degree determination unit does not perform image processing that causes blurriness on the projection image.

12. An image processing method comprising:

via a glasses-type display device that is capable of allowing a user to visually recognize a display image displayed on a display unit as a virtual image together with a real space, displaying the display image as the virtual image, performing, via a processor, image processing based on a visual characteristic of the user on the display image, wherein an amount of reduction of a degree of blurriness is derived by combining visual characteristic information and attribute information, wherein the attribute information includes display content and a degree of importance of the display content; and displaying the display image after the image processing on the display unit.

13. A non-transitory storage medium storing an image processing program causing a glasses-type display device that is capable of allowing a user to visually recognize a display image displayed on a display unit as a virtual image together with a real space, to execute a process comprising:

displaying the display image as the virtual image, performing, via a processor, image processing based on a visual characteristic of the user on the display image, wherein an amount of reduction of a degree of blurriness is derived by combining visual characteristic information and attribute information, wherein the attribute information includes display content and a degree of importance of the display content; and displaying the display image after the image processing on the display unit.

* * * * *